US007567312B2

(12) United States Patent
Lin et al.

(10) Patent No.: US 7,567,312 B2
(45) Date of Patent: Jul. 28, 2009

(54) TRANSFLECTIVE LIQUID CRYSTAL DISPLAY

(75) Inventors: Ching-Huan Lin, Hsin Ying (CN); Ching-Yu Tsai, Hsinchu (TW)

(73) Assignee: AU Optronics Corporation (TW)

( * ) Notice: Subject to any disclaimer, the term of this patent is extended or adjusted under 35 U.S.C. 154(b) by 195 days.

(21) Appl. No.: 11/881,191

(22) Filed: Jul. 25, 2007

(65) Prior Publication Data

US 2007/0268418 A1 Nov. 22, 2007

Related U.S. Application Data

(62) Division of application No. 11/146,568, filed on Jun. 7, 2005, now Pat. No. 7,286,192.

(51) Int. Cl.
*G02F 1/136* (2006.01)

(52) U.S. Cl. ............................. 349/48; 349/38; 349/39

(58) Field of Classification Search ............. 349/38–39, 349/48
See application file for complete search history.

(56) References Cited

U.S. PATENT DOCUMENTS

| | | | | |
|---|---|---|---|---|
| 5,841,494 | A | 11/1998 | Hall | 349/98 |
| 6,008,871 | A | 12/1999 | Okumura | 349/61 |
| 6,124,905 | A | 9/2000 | Iijima | 349/62 |
| 6,199,989 | B1 | 3/2001 | Maeda et al. | 359/613 |
| 6,466,280 | B1 | 10/2002 | Park et al. | 349/43 |
| 6,508,560 | B2 | 1/2003 | Epstein et al. | 359/606 |
| 6,567,060 | B1 | 5/2003 | Sekiguchi | 345/87 |
| 6,567,141 | B1 | 5/2003 | Kaneko et al. | 349/117 |
| 6,574,044 | B1 | 6/2003 | Sahouani et al. | 359/498 |
| 6,577,361 | B1 | 6/2003 | Sekiguchi et al. | 349/96 |
| 6,580,480 | B2 | 6/2003 | Baek et al. | 349/114 |
| 6,606,139 | B2 | 8/2003 | Yoshii et al. | 349/114 |
| 6,608,660 | B1 | 8/2003 | Okamoto et al. | 349/113 |
| 6,611,305 | B2 | 8/2003 | Kamijo et al. | 349/112 |
| 6,628,369 | B2 | 9/2003 | Kumagai et al. | 349/194 |
| 2004/0004685 | A1 | 1/2004 | Luo | 349/113 |
| 2007/0064182 | A1 | 3/2007 | Lin et al. | 349/114 |

*Primary Examiner*—David Nelms
*Assistant Examiner*—Phu Vu
(74) *Attorney, Agent, or Firm*—Ware, Fressola Van Der Sluys and Adolphson, LLP

(57) ABSTRACT

A transflective liquid crystal display having a plurality of pixels, each pixel having a plurality of color sub-pixels, each sub-pixel having a transmission area associated with a first charge storage capacitance and a reflection area associated with a second storage capacitance. In the sub-pixel, a data line, a first gate line, a second gate line and a common line are used to control the operational voltage on the liquid crystal layer associated with the sub-pixel. The first and second gate lines are separately set at a first state and a second state. The ratio of the first charge storage capacitance to the second charge storage capacitance can be controlled according to the states of the gate lines. The second charge storage capacitance is provided by two capacitors connected in parallel through a switching element which can be open or closed according to the states of the gate lines.

14 Claims, 12 Drawing Sheets

TRANSFLECTIVE LIQUID CRYSTAL DISPLAY

This application is a divisional application of and claims priority to a U.S. patent application Ser. No. 11/146,568, filed Jun. 7, 2005 now U.S. Pat. No. 7,286,192.

FIELD OF THE INVENTION

The present invention relates generally to a liquid crystal display panel and, more particularly, to a transflective-type liquid crystal display panel.

BACKGROUND OF THE INVENTION

Due to the characteristics of thin profile and low power consumption, liquid crystal displays (LCDs) are widely used in electronic products, such as portable personal computers, digital cameras, projectors, and the like. Generally, LCD panels are classified into transmissive, reflective, and transflective types. A transmissive LCD panel uses a back-light module as its light source. A reflective LCD panel uses ambient light as its light source. A transflective LCD panel makes use of both the back-light source and ambient light.

As known in the art, a color LCD panel 1 has a two-dimensional array of pixels 10, as shown in FIG. 1. Each of the pixels comprises a plurality of sub-pixels, usually in three primary colors of red (R), green (G) and blue (B). These RGB color components can be achieved by using respective color filters. FIG. 2 illustrates a plan view of the pixel structure in a conventional transflective liquid crystal panel, and FIGS. 3*a* and 3*b* are cross sectional views of the pixel structure. As shown in FIG. 2, a pixel can be divided into three sub-pixels 12R, 12G and 12B and each sub-pixel can be divided into a transmission area (TA) and a reflection area (RA). In the transmission area as shown in FIG. 3*a*, light from a back-light source enters the pixel area through a lower substrate 30, and goes through a liquid crystal layer, a color filter R and the upper substrate 20. In the reflection area, light encountering the reflection area goes through an upper substrate 20, the color filter R and the liquid crystal layer before it is reflected by a reflective layer 52. Alternatively, part of the reflection area is covered by a non-color filter (NCF), as shown in FIG. 3*b*.

As known in the art, there are many more layers in each pixel for controlling the optical behavior of the liquid crystal layer. These layers may include a device layer 50 and one or two electrode layers. The device layer is typically disposed on the lower substrate and comprises gate lines 31, 32, data lines 21-24 (FIG. 2), transistors, and passivation layers (not shown).

Due to the simplicity in the pixel structure of the conventional transflective LCD panel, high chromaticity is difficult to achieve.

SUMMARY OF THE INVENTION

The present invention provides a method and a pixel structure to improve the viewing quality of a transflective-type liquid crystal display. The pixel structure of a pixel in the liquid crystal display comprises a plurality of sub-pixel segments. Each of the sub-pixel segments comprises a transmission area and a reflection area. In the sub-pixel segment, a data line, a first gate line, a second gate line and a common line are used to control the operational voltage on the liquid crystal layer areas associated with the sub-segments. In particular, the transmission area is associated with a first charge storage capacity and the reflection area is associated with a second storage capacity. The first and second gate lines can be separately set at a first control state and a second control state. The ratio of the first charge storage capacity to the second charge storage capacity can be controlled according to the states of the gate lines.

In the present invention, the transmissive electrode in the transmission area is connected to a first charge capacitor, which is further connected to the data line via a first TFT. The reflective electrode in the reflection area is connected to a second charge capacitor, which is fuirther connected to the data line via a second TFT. Both the gate of the first TFT and the gate of the second TFT are connected to the first gate line.

In the first embodiment of the present invention, the second charge capacitor is connected in parallel to a refresh capacitor via a third TFT and further connected to the common line via a fourth TFT. The gate of the third TFT is connected to the second gate line. The gate of the fourth TFT is connected to the first gate line.

In the second embodiment of the present invention, the first charge capacitor is connected in parallel to a refresh capacitor via a third TFT and further connected to the common line via a fourth TFT. The gate of the third TFT is connected to the second gate line. The gate of the fourth TFT is connected to the first gate line.

In the third embodiment of the present invention, the transmissive electrode is connected to the first capacitor via the first TFT. The transmissive electrode is further connected in parallel to a refresh capacitor and further connected to the common line via the fourth TFT. The gate of the third TFT is connected to the second gate line. The gate of the fourth TFT is connected to the first gate line.

The present invention will become apparent upon reading the description taken in conjunction with FIGS. 4-15*b*.

DETAILED DESCRIPTION OF THE INVENTION

Figure 1:
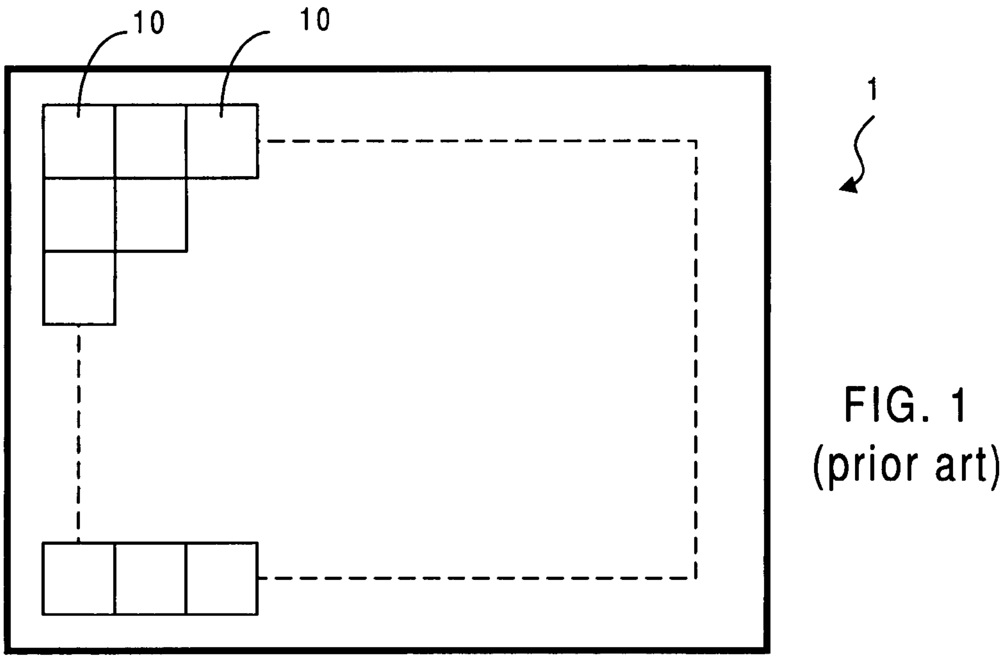
FIG. 1 (prior art)
FIG. 1 is a schematic representation showing a typical LCD display.
Figure 2:
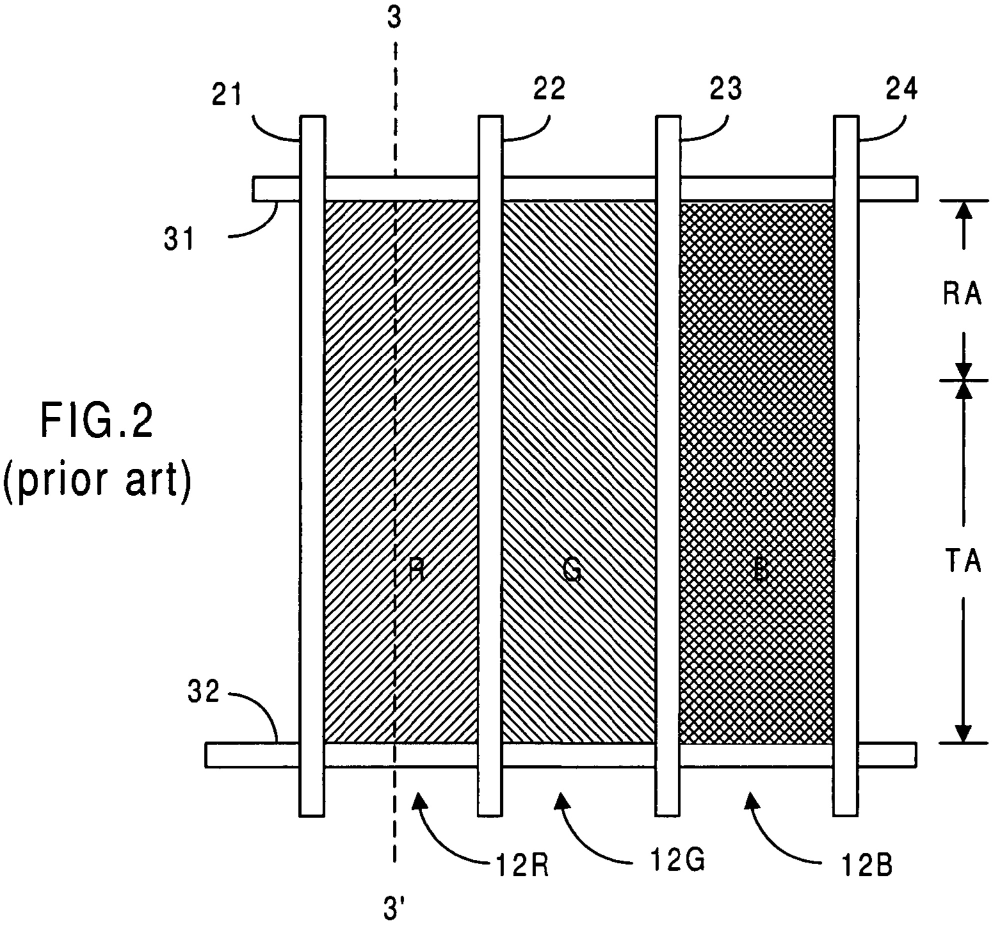
FIG.2 (prior art)
FIG. 2 is a plan view showing the pixel structure of a conventional transflective color LCD display.
Figure 3A:
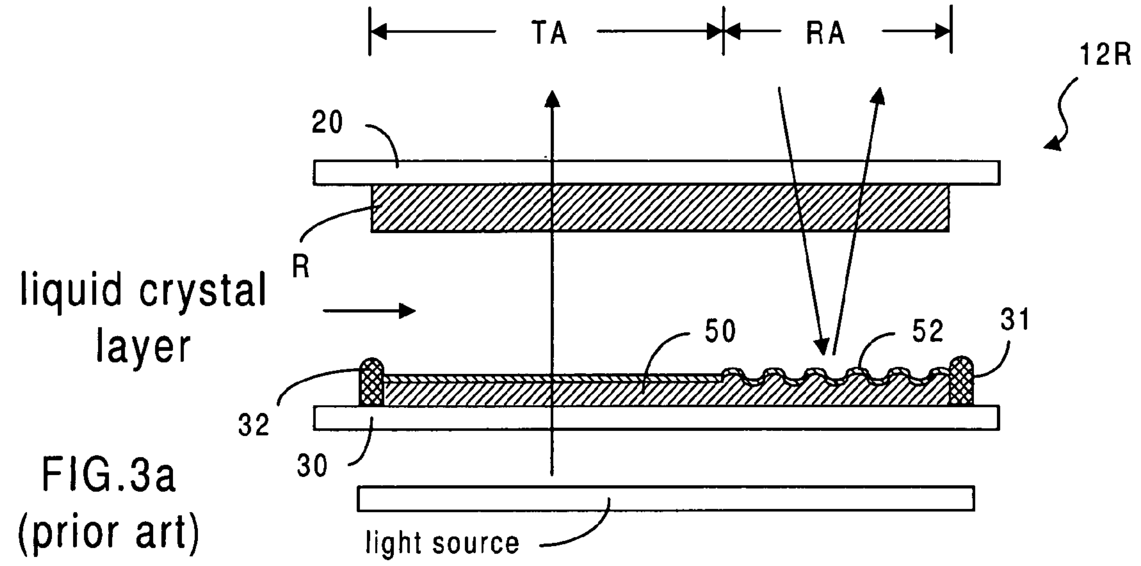
FIG.3a (prior art)
FIG. 3*a* is a cross sectional view showing the reflection and transmission of light beams in the pixel as shown in FIG. 2.
Figure 3B:
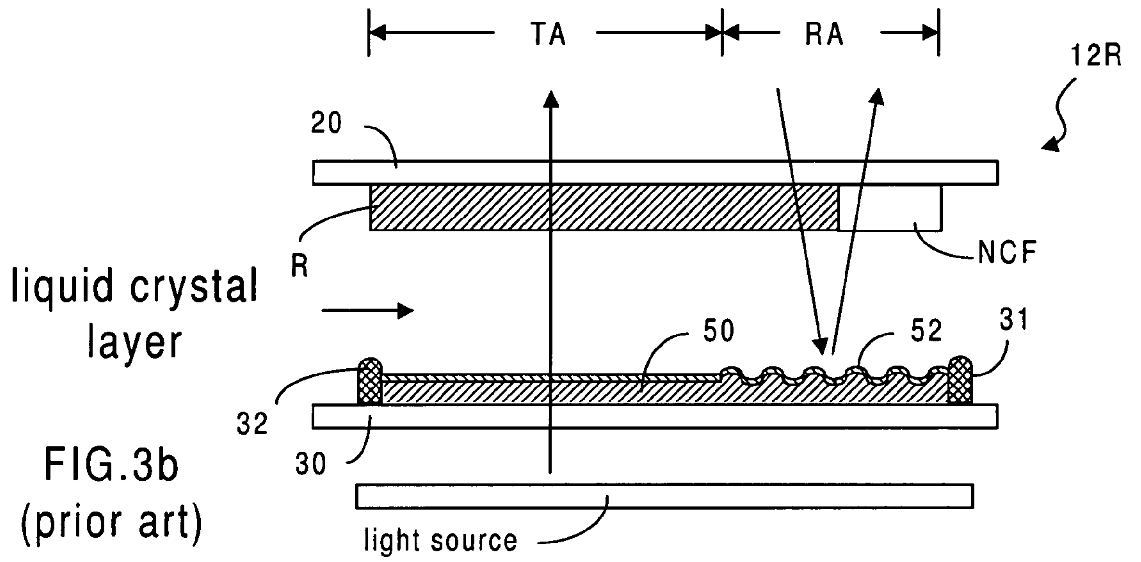
FIG.3b (prior art)
FIG. 3*b* is a cross sectional view showing the reflection and transmission of light beams in another prior art transflective display.
Figure 4:
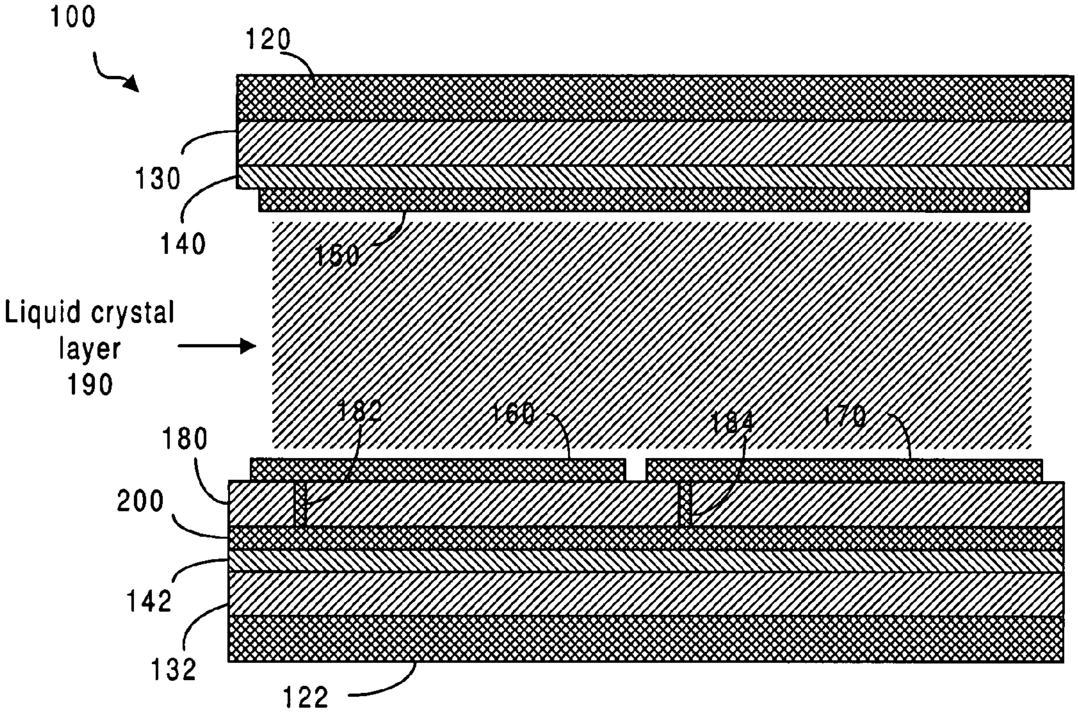
FIG. 4 is a cross sectional view showing a sub-pixel segment in an LCD display, according to the present invention.

A sub-pixel segment, according to the present invention, is shown in FIG. 4. As shown, the sub-pixel segment 100 has an upper layer structure, a lower layer structure and a liquid crystal layer 190 disposed between the upper layer structure and the lower layer structure. The upper layer comprises a polarizer 120, a haft-wave plate 130, a quarter-wave plate 140 and an upper electrode 150. The upper electrode 150 is made from a substantially transparent material such as ITO (Indium-tin oxide). The lower layer structure comprises an electrode layer having a transmission electrode 160 and a reflection electrode 170. The transmission electrode 160 is made from a transparent material such as ITO. The reflection electrode 170 also serves as a reflector and is made from one or more highly reflective metals such as Al, Ag, Cr, Mo, Ti, and AlNd. The lower layer structure further comprises a passivation layer (PL) 180, a device layer 200, a quarter-wave plate 142, a half-wave plate 132 and a polarizer 122. In addition, the transmission electrode 160 is electrically connected to the device layer 180 via a connector 182, and the reflection electrode 170 is electrically connected to the device layer 180 via a connector 184.

Figure 5A:
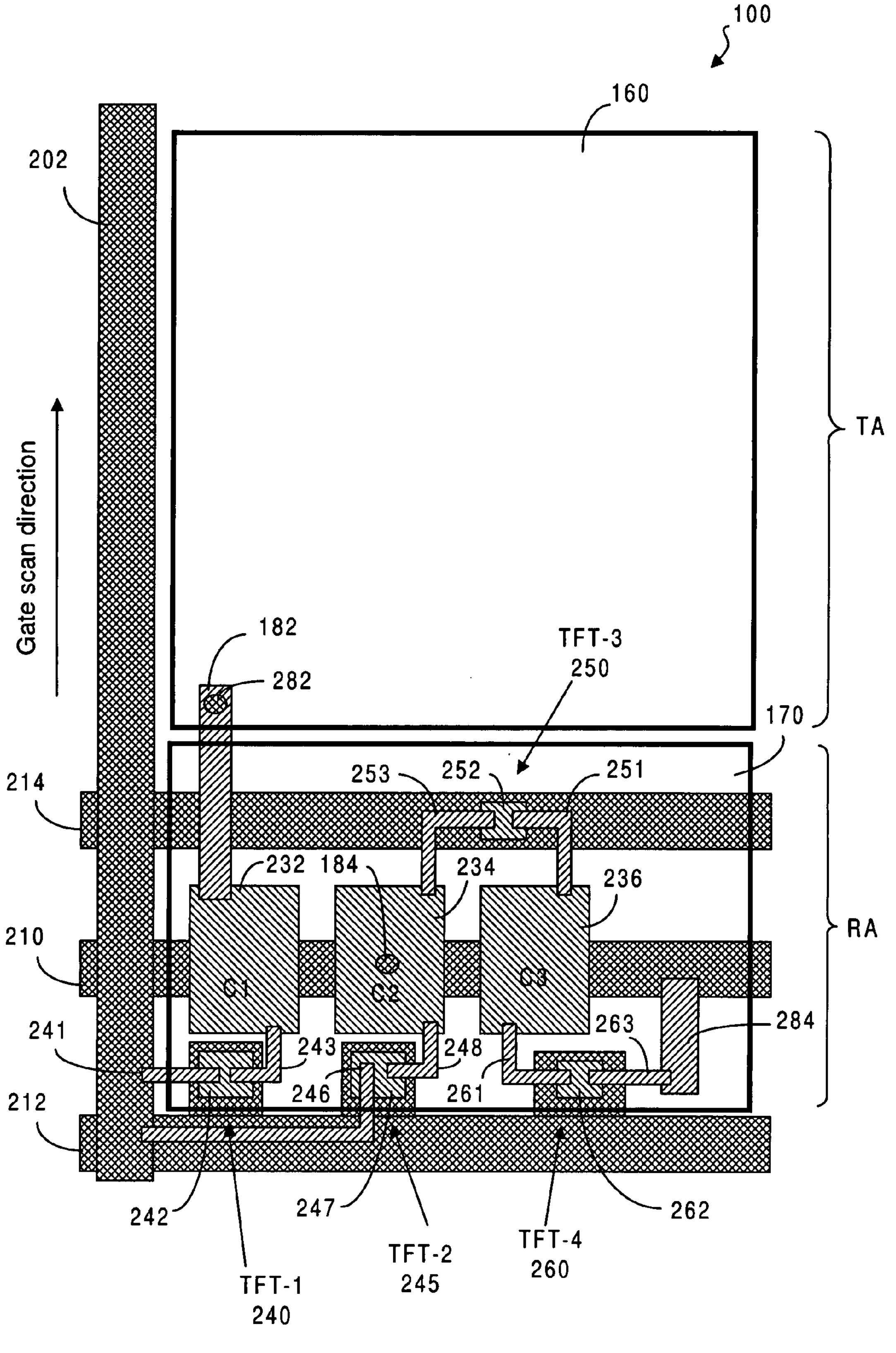
FIG. 5*a* is a plan view showing a sub-pixel segment, according to one embodiment of the present invention.

The plan view of the sub-pixel segment 100 is shown in FIG. 5*a*. As shown, the transmission electrode 160 is operatively connected to a first storage capacitor 232 (C1) via connectors 182 and 282. The reflection electrode 170 is operatively connected to a second storage capacitor 234 (C2) via the connector 184. The sub-pixel segment 100 also has a refresh capacitor 236 (C3) and four switching elements 240 (TFT-1), 245 (TFT-2), 250 (TFT-3) and 260 (TFT-4) for controlling the charging and discharging of the storage capacitors through the common line 210. The first switching element 240 has two switch ends 241, 243 and a control end 242. The switch end 241 is connected to a data line 202; the switch end 243 is connected to the first storage capacitor 232 and the control end 242 is connected to a first gate line 212 (gate-line 1). The second switching element 245 has two switch ends 246, 248 and a control end 247. The switch end 246 is connected to the data line 202; the switch end 248 is connected to the second storage capacitor 234; and the control end 247 is connected to the first gate-line 212 (gate-line 1). The third switching element 250 has two switch ends 251, 253 and a control end 252. The switch end 253 is connected to the second storage capacitor 234; the switch end 251 is connected to the refresh capacitor 236; and the control end 252 is connected to a second gate-line 214 (gate-line 2). The fourth switching element 260 has two switch ends 261, 263 and a control end 262. The first switch end 261 is connected to the refresh capacitor 236, and the second switch end 263 is connected to the common line 210 via a connector 284. The control end 262 is also connected to the first gate line 212.

Figure 5B:
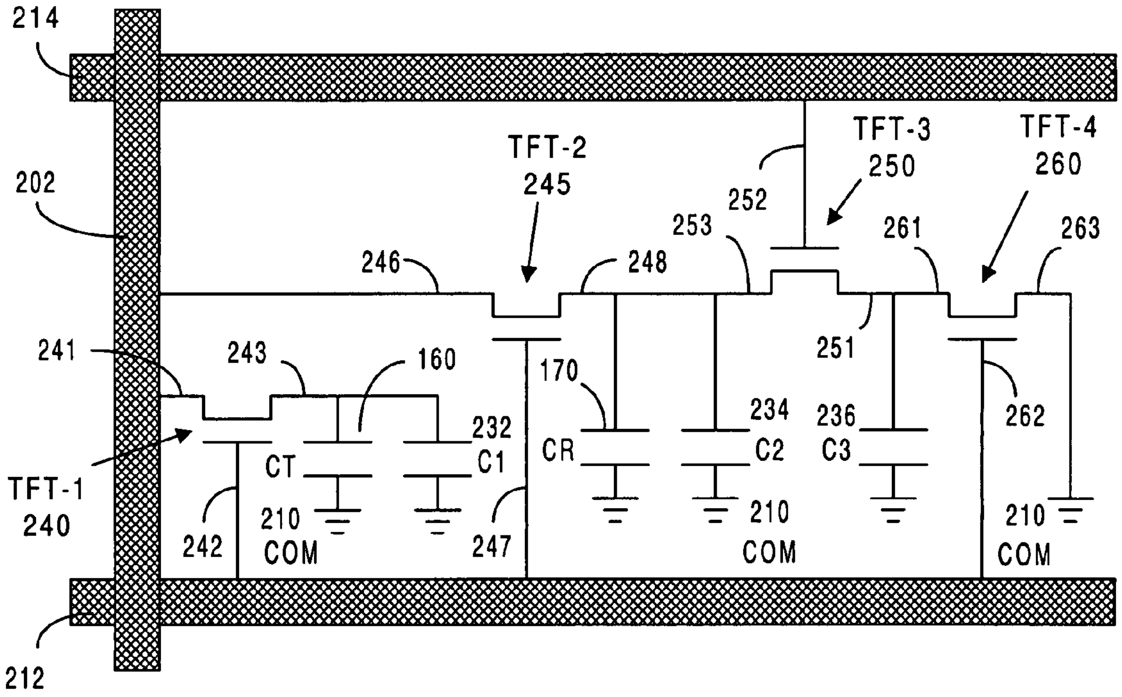
FIG. 5*b* is a circuit diagram showing an equivalent circuit of the sub-pixel segment of FIG. 5*a*.
Figure 6A:
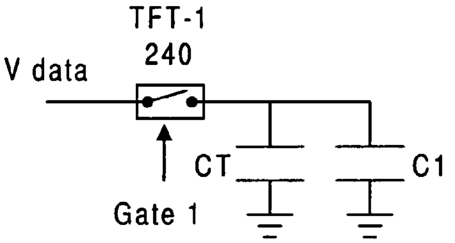
FIG. 6*a* is the equivalent circuit of the transmission area in the sub-pixel segment of FIG. 5*a*
Figure 6B:
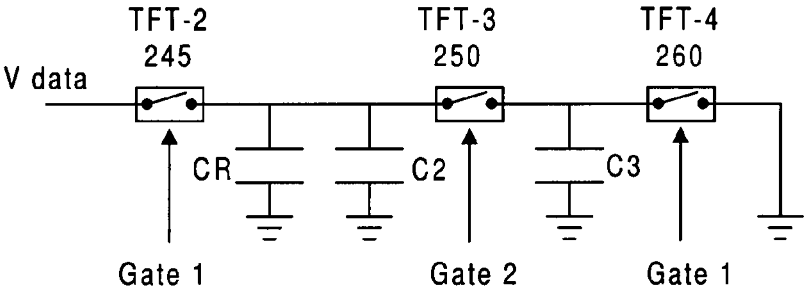
FIG. 6*b* is the equivalent circuit of the reflection area in the sub-pixel segment of FIG. 5*a*

The equivalent circuit for the electronic components in the sub-pixel segment 100 is shown in FIG. 5*b*. As shown, the transmission electrode 160 has a capacitance CT connected to the first storage capacitor 232 in parallel. These capacitors are connected to the data line 202 via the first switching element 240. The reflection electrode 170 has a capacitance CR separately connected to the second storage capacitor 234 in parallel. These capacitors are separately connected to the data line 202 via the second switching element 245. The capacitor 234 is also connected to the refresh capacitor 236 in parallel via the third switching element 250. The refresh capacitor 236 is also connected to the common line 210 through the fourth switching element 260. As shown in FIG. 6*a*, the charging and discharging of the capacitors CT and C I is controlled by gate-line 1 through the first switching element 240. As shown in FIG. 6*b*, the charging and discharging of the capacitors CR, C2 and C3 are controlled by gate-line 2 through the third switching element 250, and by gate-line 1 through both the second switching element 245 and the fourth switching element 260.

Figure 7A:
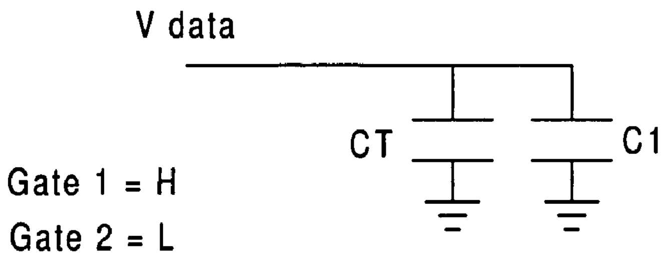
FIG. 7*a* is the equivalent circuit of the transmission area in the sub-pixel segment when the gate lines are set at a first control state.
Figure 7B:
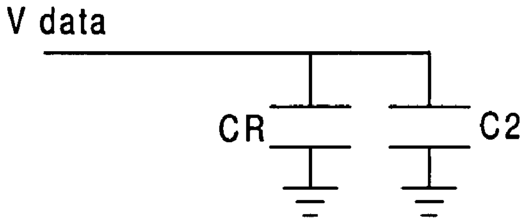
FIG. 7*b* is the equivalent circuit of the reflection area in the sub-pixel segment when the gate lines are set at the first control state
Figure 7C:
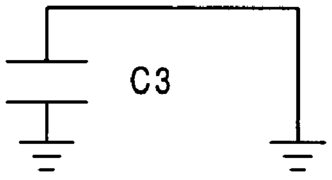
FIG. 7*c* is the equivalent circuit of the control capacitor, when the gate lines are set at the first control state.

In the first control state, gate-line 1 is set to high and gate-line 2 is set to low. When gate-line 1=high, the switching elements 240, 245 and the switching element 260 are closed ("ON"). When gate-line 2=low, the switching element 250 is open ("OFF"). In this control state, the capacitors CT and C1 are connected to the data line 202, as shown in FIG. 7*a*. Thus, the transmission electrode 160 has the same potential ($V_{data}$) of the data line 202. The capacitors CR and C2 are operatively connected to the data line 202, but disconnected from the refresh capacitor C3, as shown in FIGS. 7*b* and 7*c*. Thus, the reflection electrode 170 has the same potential ($V_{data}$) of the data line 202. The refresh capacitor C3 is discharged, but its potential is in equilibrium with the voltage on common line 210.

Figure 8A:
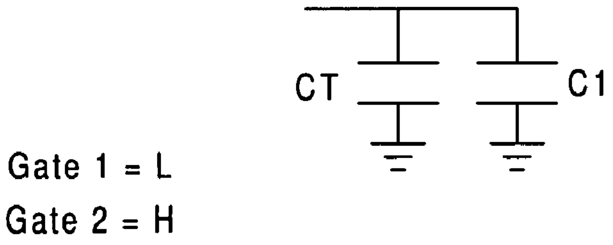
FIG. 8*a* is the equivalent circuit of the transmission area in the sub-pixel segment when the gate lines are set at a second control state.
Figure 8B:
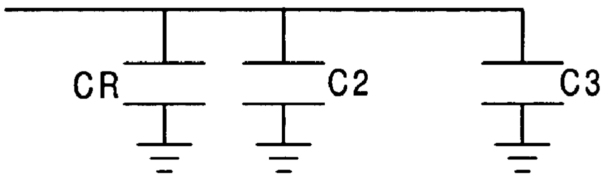
FIG. 8*b* is the equivalent circuit of the reflection area in the sub-pixel segment when the gate lines are set at the second control state.

In the second control state, gate-line 1 is set to low and gate-line 2 is set to high. When gate-line 1=low, the switching elements 240, 245 and the switching element 260 are open ("OFF"). When gate-line 2=high, the switching element 250 is closed ("ON"). In this control state, the capacitors CT and C1 are disconnected from the data line 202, as shown in FIG. 8*a*. The potential of capacitors CT and C2 remain the same voltage for a period of time. Thus, the transmission electrode 160 substantially maintains its original potential $V_{data}$. The capacitors CR and C2 are now connected to the refresh capacitor C3 in parallel as shown in FIG. 8*b*. The overall capacitance associated with the reflection electrode 170 is increased from (CR+C2) to (CR+C2+C3). As a result, the potential on the reflection electrode 170 is reduced. Thus, the voltage differential across the liquid crystal layer in the reflection area is lower than that of the liquid crystal layer in the transmission area.

Using the refresh capacitor C3 and the switching elements 240, 245, 250 and 260, it is possible to control the optical behavior of the liquid crystal layer in the reflection area as compared to that in the transmission area. In order to show the improvement in the viewing quality of the liquid crystal display using the sub-pixel segment, according to the present invention, various values of the refresh capacitor have been used in the response measurement. We have chosen C3/(CR+C2)=1/3, 2/5 and 1/2.

Figure 9:
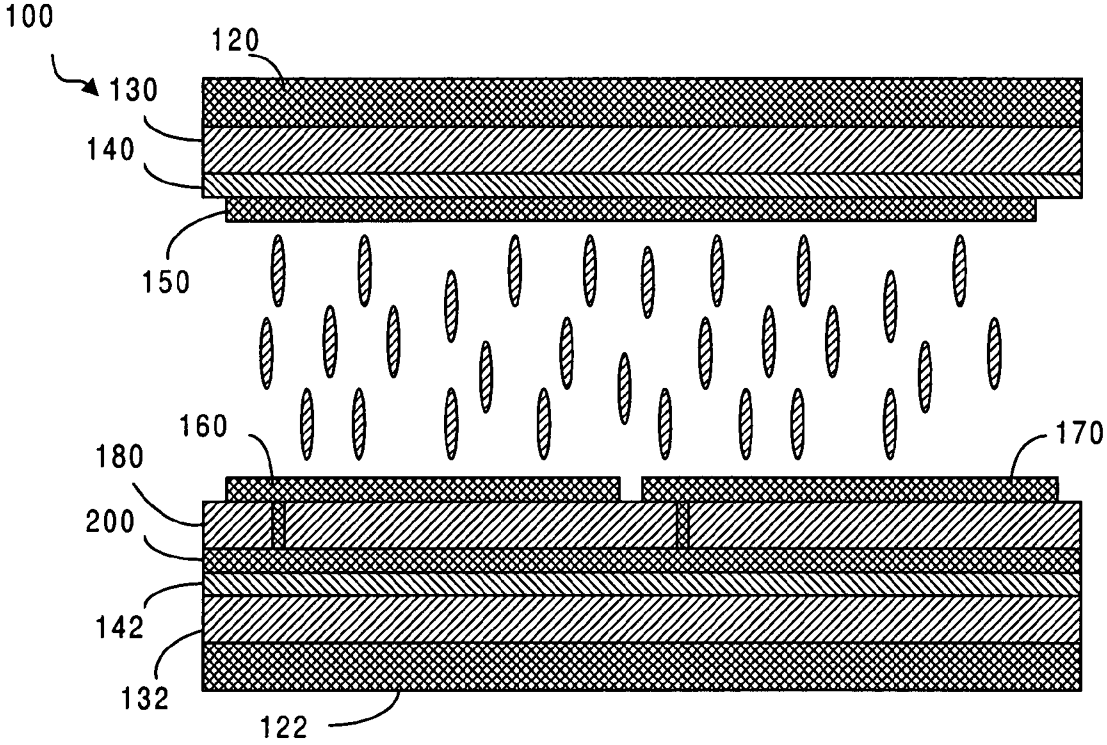
FIG. 9 is a schematic representation showing a sub-pixel segment wherein the liquid crystal molecules are aligned at a first orientation when the liquid crystal layer is subject to an electric field.
Figure 12:
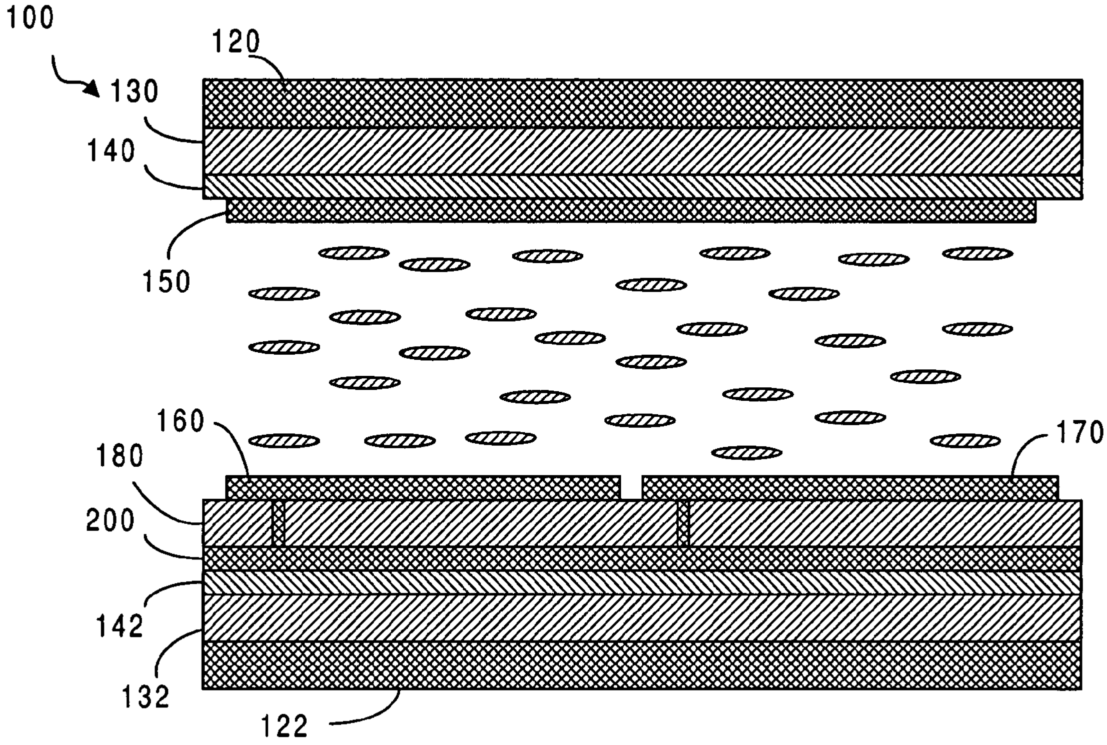
FIG. 12 is a schematic representation showing a sub-pixel segment wherein the liquid crystal molecules are aligned at a second orientation when the liquid crystal layer is subject to an electric field.
Figure 10:
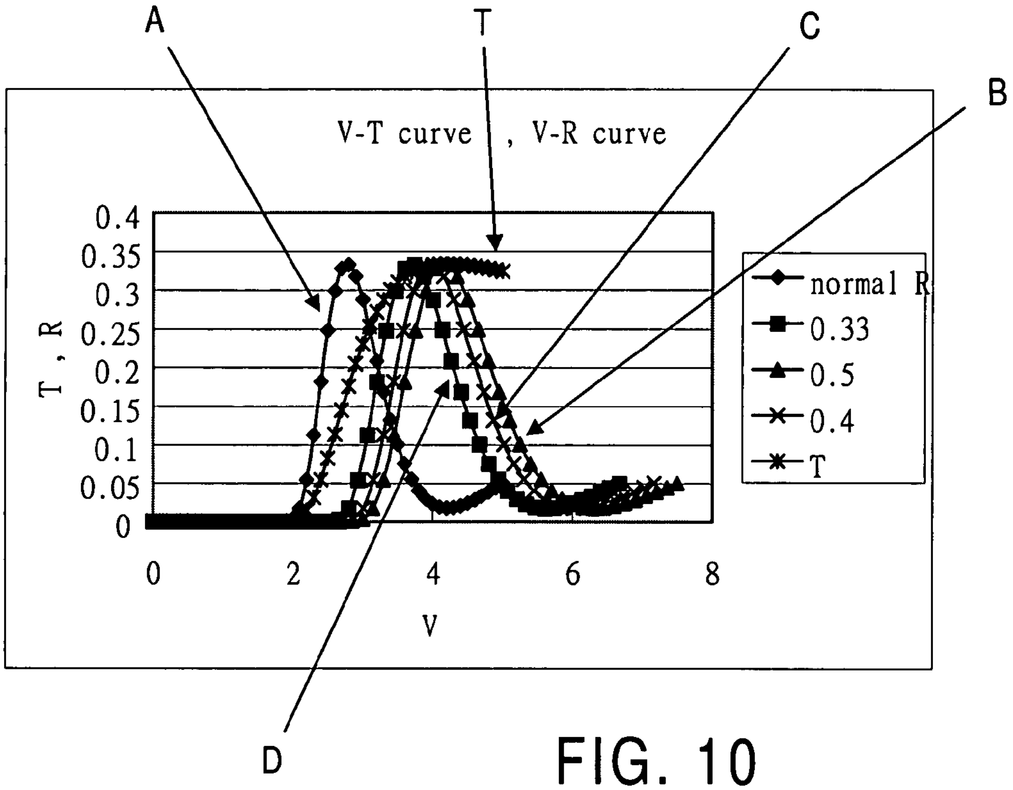
FIG. 10 is a plot showing the response in transmissivity and reflectivity as a function of operational voltage.

Two different polarization states of the liquid crystal layer have been used for response measurement in order to show the improvement in the view quality. In a first response measurement, the liquid crystal display is arranged such that the liquid crystal molecules are aligned in an orientation substantially perpendicular to the electrodes when a voltage potential is applied across the electrodes. A schematic representation of a sub-pixel segment of the liquid crystal display is shown in FIG. 9. A plot of transmissivity (T, normal incidence and direct view) and reflectivity (R, normal incidence and exit) of the liquid crystal layer as a finction of operational voltage $V_{data}$ is shown in FIG. 10. As can be seen in FIG. 10, without the capacitance adjustment on the reflection electrode (Curve A), the optimal operational voltage for the reflectivity response occurs at a much lower voltage than the optimal operational voltage for the transmissivity response (Curve T). With C3/(CR+C2)=2/5, the optimal operational voltage for both the transmissivity response and the reflectivity response (Curve C) occur at about 4V. The reflectivity response for C3/(CR+C2)=0.5 is shown as Curve B and that for C3/(CR+C2)=1/3 is shown as Curve D.

Figure 11A:
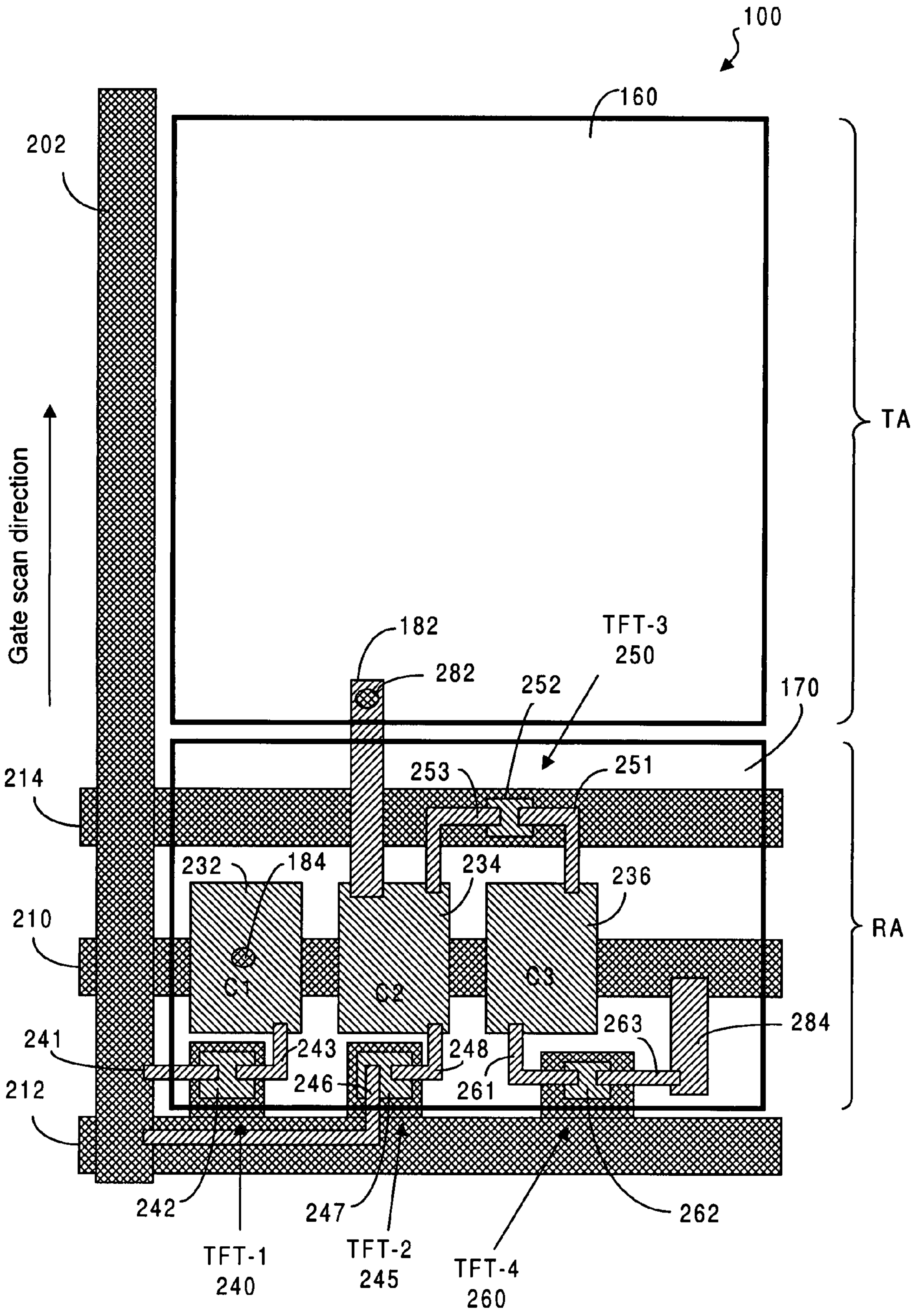
FIG. 11*a* is a plan view showing a sub-pixel segment, according to another embodiment of the present invention.
Figure 11B:
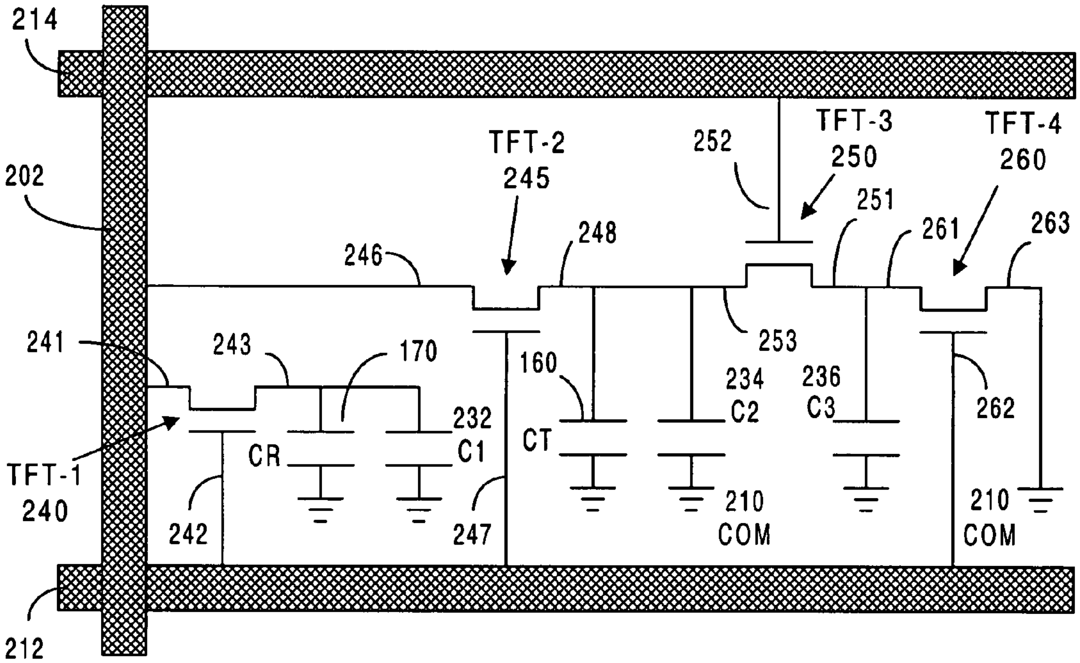
FIG. 11*b* is a circuit diagram showing an equivalent circuit of the sub-pixel segment of FIG. 11*a*.

In another embodiment of the present invention, the first storage capacitor 232 is connected to the reflection electrode 170 and the second storage capacitor 234 is connected to the transmission electrode 160, as shown in FIG. 11*a*. The second storage capacitor 234 is connected to the refresh capacitor 236 through the third switching element 250. The equivalent circuit of this arrangement is shown in FIG. 11*b*. When the control state is switched from (gate-line 1=high, gate-line 2=low) to (gate-line 1=low, gate-line 2=high), the voltage potential of the transmission electrode 160 is reduced by a factor of (CT+C2)/(CT+C2+C3).

Figure 13:
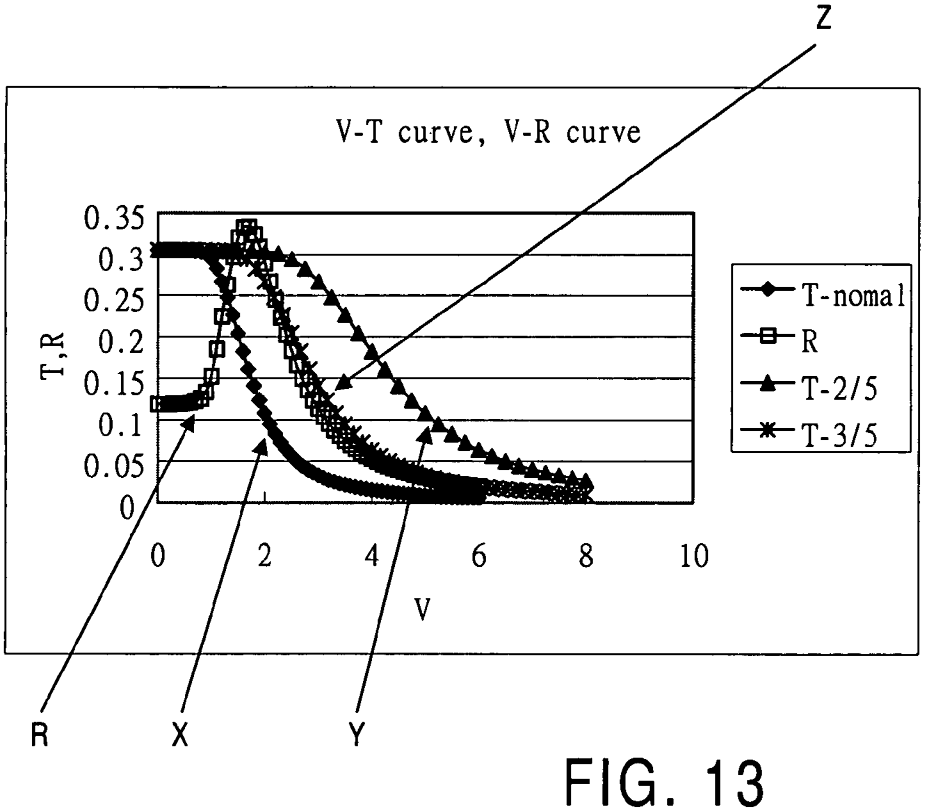
FIG. 13 is a plot showing the response in transmissivity and reflectivity as a function of operational voltage.

This embodiment has been used to measure the responses in transmissivity and reflectivity when the liquid crystal display is arranged such that the liquid crystal molecules are aligned in an orientation substantially parallel to the electrodes when a voltage potential is applied across the electrodes. A schematic representation of a sub-pixel segment of the liquid crystal display is shown in FIG. 11. We have chosen (CT+C2)/(CT+C2+C3)=2/5 and 3/5 in the measurement. A plot of transmissivity (T, normal incidence and direct view) and reflectivity (R, normal incidence and exit) of the liquid crystal layer as a flmction of operational voltage $V_{data}$ is shown in FIG. 13. As can be seen in FIG. 10, without the capacitance adjustment on the transmission electrode, the transmission response (Curve X) and the reflection response (Curve R) do not match in most of the practical voltage range. With (CT+C2)/(CT+C2+C3)=2/5, the transmissivity response (Curve Y) does not match the reflection response in the practical voltage range. However, with (CT+C2)/(Ct+C2+C3)=3/5, the transmissivity response (Curve Z) matches the reflection response reasonably well from $V_{data}$=2V to 6V.

Figure 14B:
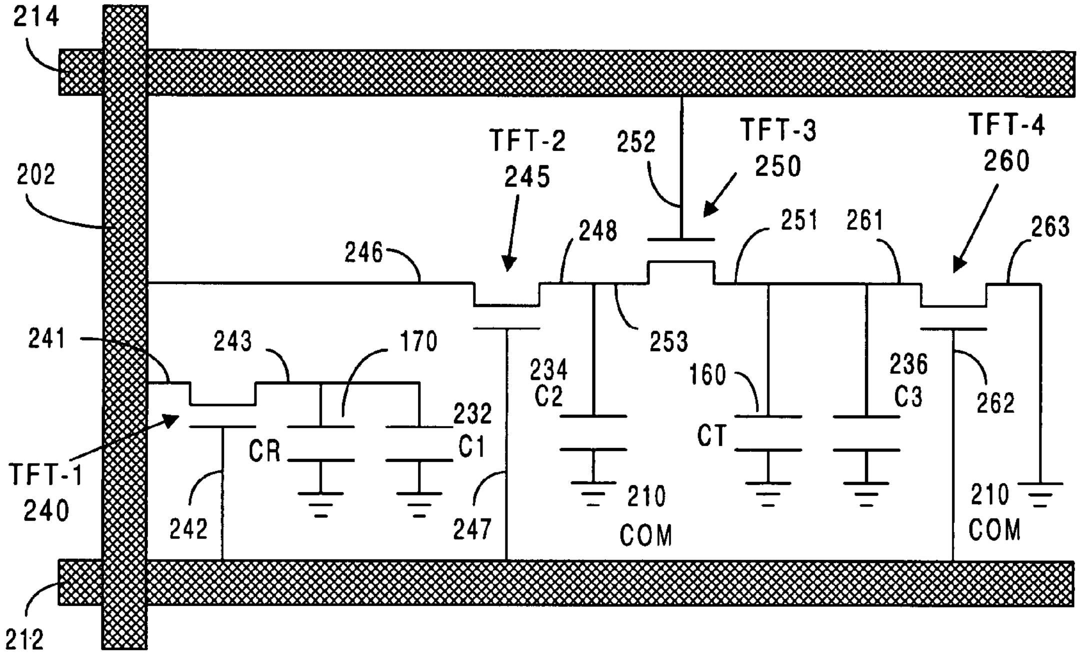
FIG. 14*b* is a circuit diagram showing an equivalent circuit of the sub-pixel segment of FIG. 14*a*.
Figure 14A:
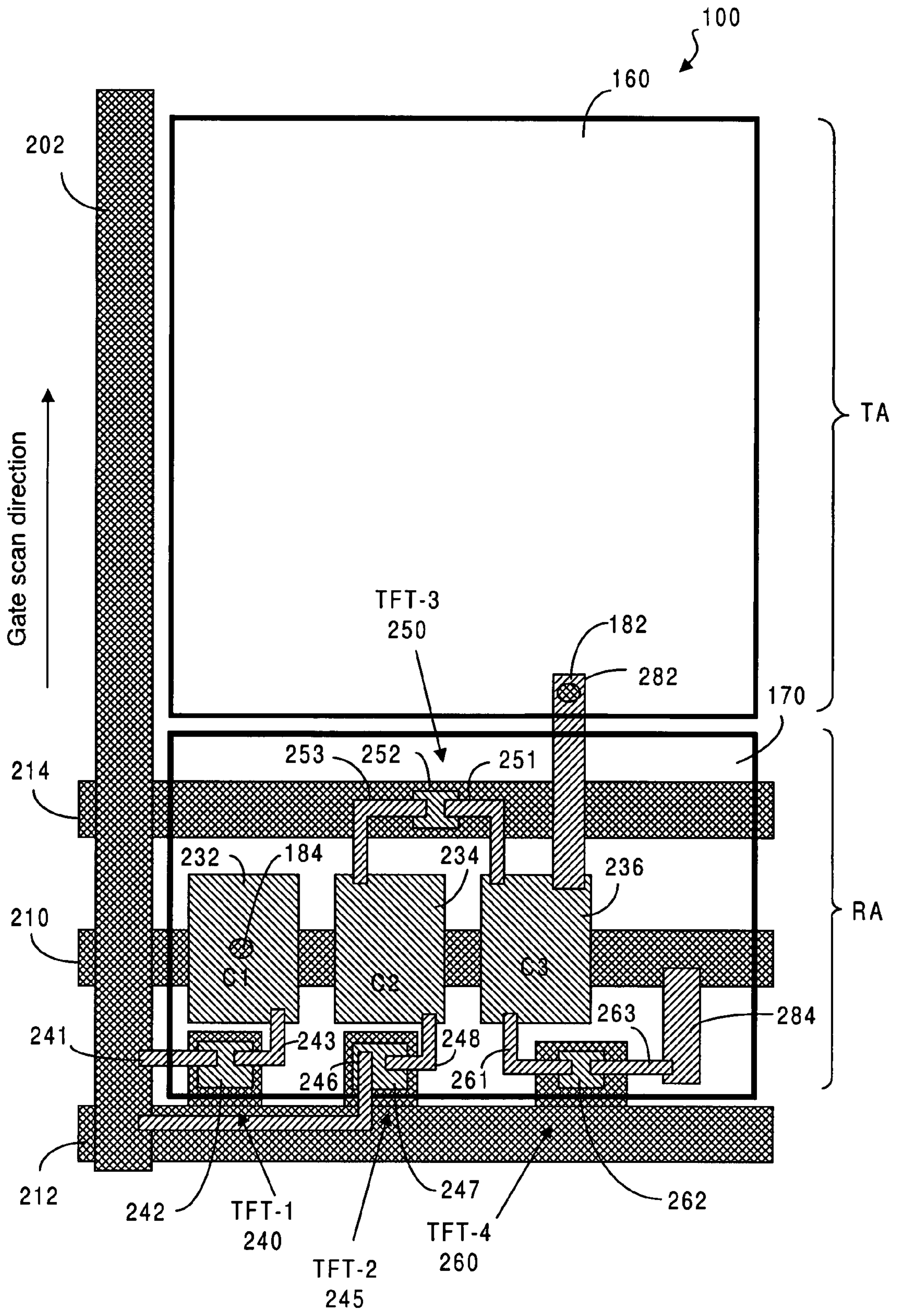
FIG. 14*a* is a plan view showing a sub-pixel segment, according to another embodiment of the present invention.

In yet another embodiment of the present invention, the first storage capacitor 232 is connected to the reflection electrode 170 and the refresh capacitor 236 is connected to the transmission electrode 160, as shown in FIG. 14*a*. The second storage capacitor 234 is connected to the transmission electrode 160 and the refresh storage capacitor 236 via the third switching element 250. The equivalent circuit of this arrangement is shown in FIG. 14*b*. When the control state is set at gate-line 1=high and gate-line 2=low, the refresh storage capacitor 236 is discharged so that the voltage potential between the transmission electrode 160 and the common line 210 becomes zero. At the same time, the second storage capacitor 234 is charged to $V_{data}$. When the control state is switched to gate-line 1=low and gate-line 2=high, the charges on the second storage capacitor 234 are shared by the refresh capacitor 236.

Figure 15B:
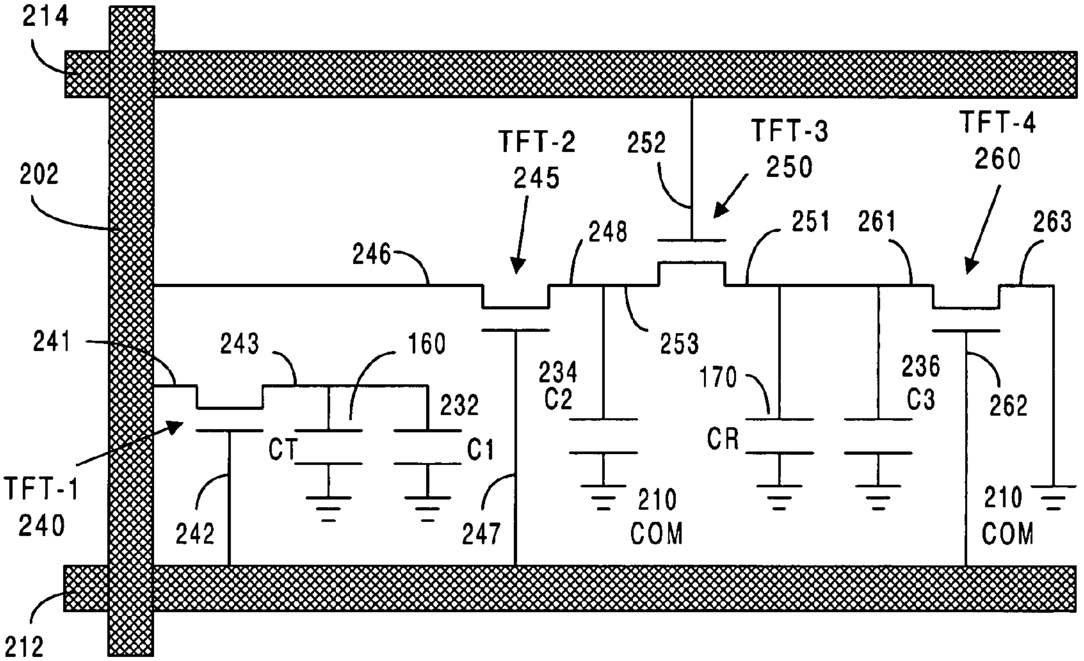
FIG. 15*b* is a circuit diagram showing an equivalent circuit of the sub-pixel segment of FIG. 15*a*.
Figure 15A:
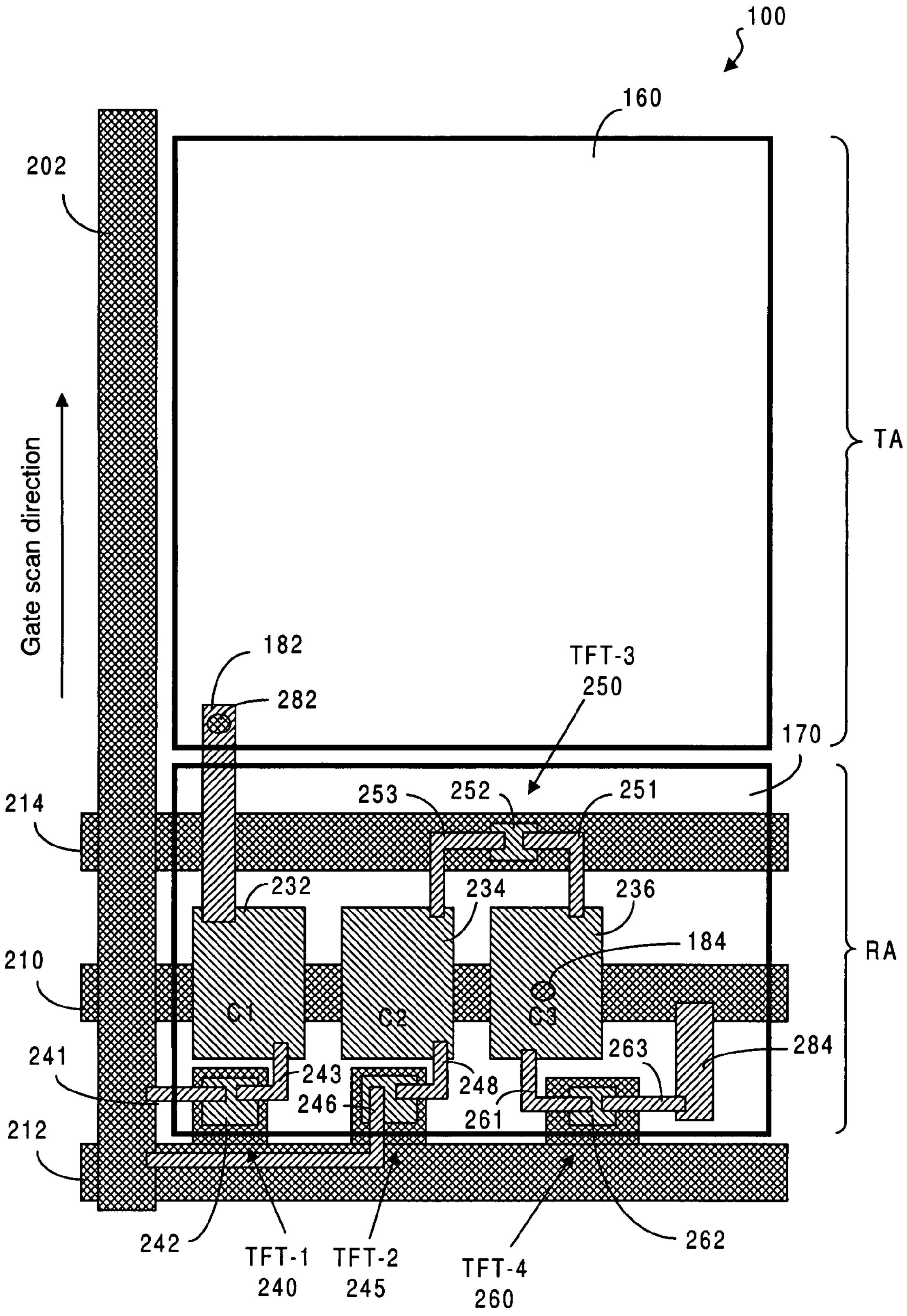
FIG. 15*a* is a plan view showing a sub-pixel segment, according to another embodiment of the present invention.

In still another embodiment of the present invention, the first storage capacitor 232 is connected to the transmission electrode 160 and the refresh capacitor 236 is connected to the reflection electrode 170, as shown in FIG. 15*a*. The second storage capacitor 234 is connected to the reflection electrode 170 and the refresh capacitor 236 via the third switching element 250. The equivalent circuit of this arrangement is shown in FIG. 15*b*. When the control state is set at gate-line 1=high and gate-line 2=low, the refresh capacitor is discharged so that the voltage potential between the reflection electrode 170 and the common line 210 becomes zero. At the same time, the second storage capacitor 234 is charged to $V_{data}$. When the control state is switched to gate-line 1=low and gate-line 2=high, the charges on the second storage capacitor 234 are shared by the refresh capacitor 236.

In sum, by adjusting the capacitance associated with the transmission electrode 160 or the reflection electrode 170, it is possible to improve the matching between the transmission response and the reflectivity response. Capacitance adjustment can be achieved by 1) separately connecting one or more storage capacitors to the transmission electrode and the reflection electrode and 2) connecting one or more refresh capacitors to the transmission electrode or the reflection electrode via a switching element, and 3) connecting the storage capacitors and the refresh capacitors to a plurality of switching elements controllable by at least two gate lines. By setting the gate lines at different control states, it is possible to adjust locally the optical responses of the liquid crystal layer in order to achieve a substantial match between the transmissivity response and the reflection response.

It should be noted that the present invention has been disclosed in conjunction with two embodiments. In the embodiment as shown in FIG. 5*a*, the effective voltage potential applied to the liquid crystal layer in the reflection area is changed by adjusting the capacitance associated with the reflection electrode. In the embodiment as shown in FIG. 9, the effective voltage potential applied to the liquid crystal layer in the transmission area is changed by adjusting the capacitor associated with the transmission electrode. It should be understood that it is possible to adjust both the capacitance associated with the transmission electrode and the capacitance associated with the reflection electrode in the same sub-pixel segment, if so desired.

Thus, although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A method for improving viewing quality of a transflective liquid crystal display having a first side, an opposing second side, and a liquid crystal layer disposed between the first and second sides, the display comprising a plurality of pixels, at least some of the pixels including a plurality of sub-pixels, each sub-pixel comprising a transmission area and a reflection area, wherein the transmission area comprises a transmissive electrode disposed adjacent to the second side, allowing light entering the sub-pixel from the second side to be transmitted through the transmissive electrode, and the liquid crystal layer and then to the first side, and the reflection area comprises a reflective electrode disposed adjacent to the second side spaced from the transmissive electrode, allowing light entering the sub-pixel from the first side through the liquid crystal layer to be reflected by the reflective electrode back through the liquid crystal layer and then to the first side, and wherein the liquid crystal display is operable in a first state and in a second state for controlling optical behavior of the liquid crystal layer for viewing, said method comprising the steps of:

providing a first charge storage capacitance in the transmission area;

providing a second charge storage capacitance in the reflection area, the second charge storage capacitance having a relative capacitance value compared to the first charge storage capacitance; and controlling at least one of the first charge storage capacitance and the second charge storage capacitance such that the relative capacitance value when the liquid crystal display is operated in the first state is different from the relative capacitance value when the liquid crystal display is operated in the second state.

2. The method of claim 1, further comprising the step of:

coupling a third charge storage capacitance to the second charge storage capacitance for increasing the relative capacitance value when the liquid crystal display is operated in the second state.

3. The method of claim 2, wherein the reflective electrode has a voltage potential across the liquid crystal layer in the reflective area and wherein said coupling decreases the voltage potential when the liquid crystal display is operated in the second state.

4. The method of claim 2, further comprising the step of:

coupling the third charge storage capacitance to a switching element such that the switching element keeps the second charge storage capacitance electrically uncoupled from the third charge storage capacitance when the liquid crystal display is operated in the first stage, and the switching element is caused to electrically connect the second charge storage capacitance to the third charge storage capacitance in parallel so as to increase the relative capacitance value when the liquid crystal display is operated in the second state.

5. The method of claim 4, further comprising:

coupling the switching element to a gate line, wherein the gate line has a first voltage level when the liquid crystal display is operated in a first state and the gate line has a different second voltage level for causing the switching element to electrically connect the second charge storage capacitance to the third charge storage capacitance in parallel so as to increase the relative capacitance value when the liquid crystal display is operated in the second state.

6. The method of claim 1, further comprising the step of:

coupling a third charge storage capacitance to the first charge storage capacitance for decreasing the relative capacitance value when the liquid crystal display is operated in the second state.

7. The method of claim 6, wherein the transmissive electrode has a voltage potential across the liquid crystal layer in the transmissive area and wherein said coupling decreases the voltage potential when the liquid crystal display is operated in the second state.

8. The method of claim 6, further comprising the step of:

coupling the third charge storage capacitance to a switching element such that the switching element keeps the first charge storage capacitance electrically uncoupled from the third charge storage capacitance when the liquid crystal display is operated in the first stage, and the switching element is caused to electrically connect the first charge storage capacitance to the third charge storage capacitance in parallel so as to decrease the relative capacitance value when the liquid crystal display is operated in the second state.

9. The method of claim 8, further comprising:

coupling the switching element to a gate line, wherein the gate line has a first voltage level when the liquid crystal display is operated in a first state and the gate line has a different second voltage level for causing the switching element to electrically connect the first charge storage capacitance to the third charge storage capacitance in parallel so as to decrease the relative capacitance value when the liquid crystal display is operated in the second state.

10. A liquid crystal display having a first side and a second side, comprising:

a plurality of pixels;

a liquid crystal layer disposed between the first and second sides, wherein at least some of the pixels include a plurality of sub-pixels, each sub-pixel comprising a transmission area and a reflection area, wherein the transmission area comprises a transmissive electrode disposed adjacent to the second side, allowing light entering the sub-pixel from the second side to be transmitted through the transmissive electrode, and the liquid crystal layer and then to the first side, and the reflection area comprises a reflective electrode disposed adjacent to the second side spaced from the transmissive electrode, allowing light entering the sub-pixel from the first side through the liquid crystal layer to be reflected by the reflective electrode back through the liquid crystal layer and then to the first side, and wherein the liquid crystal display is operable in a first state and in a second state for controlling optical behavior of the liquid crystal layer for viewing:

a first charge storage capacitance coupled to the transmissive electrode;

a second charge storage capacitance coupled to the reflective electrode, the second charge storage capacitance having a relative capacitance value compared to the first charge storage capacitance; and a switching element coupled to at least one of the first charge storage capacitance and the second charge storage capacitance such that the relative capacitance value when the liquid crystal display is operated in the first state is different from the relative capacitance value when the liquid crystal display is operated in the second state.

11. The liquid crystal display of claim 10, further comprising:

a third charge storage capacitance coupled to the second charge storage capacitance in parallel for increasing the relative capacitance value when the liquid crystal display is operated in the second state.

12. The liquid crystal display of claim 11, wherein the reflective electrode is coupled to a data line for providing a voltage potential on the reflective electrode across the liquid crystal layer in the reflective area, the third charge storage capacitance is coupled to the switching element, and the switching element is coupled to a gate line, wherein the gate line has first voltage level when the liquid crystal display is operated in the first state for keeping the second charge storage capacitance uncoupled from the third charge storage capacitance, and the gate line has a different second voltage level when the liquid crystal display is operated in the second state for electrically connecting the second charge storage capacitance to the third charge storage capacitance in parallel so as to increase the relative capacitance value and to decrease the voltage potential on the reflective electrode.

13. The liquid crystal display of claim 10, further comprising:

a third charge storage capacitance coupled to the first charge storage capacitance in parallel for decreasing the relative capacitance value when the liquid crystal display is operated in the second state.

14. The liquid crystal display of claim 13, wherein the reflective electrode is coupled to a data line for providing a voltage potential on the transmissive electrode across the liquid crystal layer in the reflective area, the third charge storage capacitance is coupled to the switching element, and the switching element is coupled to a gate line, wherein the gate line has a first voltage level when the liquid crystal display is operated in the first state for keeping the first charge storage capacitance uncoupled from the third charge storage capacitance, and the gate line has a different second voltage level when the liquid crystal display is operated in the second state for electrically connecting the first charge storage capacitance to the third charge storage capacitance in parallel so as to decrease the relative capacitance value and the voltage potential on the transmissive electrode.

* * * * *